US010740299B2

(12) United States Patent
Benraz (10) Patent No.: US 10,740,299 B2
(45) Date of Patent: *Aug. 11, 2020

(54) SYSTEMS AND METHODS FOR PROVIDING CONTINUING ACCESS TO A REMOTE COMPUTER PROGRAM (71) Applicant: Yosef Benraz, Herzliya (IL)

(72) Inventor: Yosef Benraz, Herzliya (IL)

(*) Notice: Subject to any disclaimer, the term of this patent is extended or adjusted under 35 U.S.C. 154(b) by 137 days.

This patent is subject to a terminal disclaimer.

(21) Appl. No.: 15/706,711

(22) Filed: Sep. 17, 2017

(65) Prior Publication Data
US 2018/0004771 A1   Jan. 4, 2018

Related U.S. Application Data (63) Continuation of application No. 14/571,127, filed on Dec. 15, 2014, now Pat. No. 9,811,528.

(51) Int. Cl.
G06F 11/16 (2006.01)
G06F 16/178 (2019.01)
G06F 16/27 (2019.01)
G06F 16/176 (2019.01)
G06F 11/30 (2006.01)
G06F 11/34 (2006.01)
G06F 11/20 (2006.01)

(52) U.S. Cl.
CPC ........ G06F 16/178 (2019.01); G06F 11/1658 (2013.01); G06F 11/3006 (2013.01); G06F 11/3419 (2013.01); G06F 16/176 (2019.01); G06F 16/27 (2019.01); G06F 11/2094 (2013.01); G06F 11/2097 (2013.01)

(58) Field of Classification Search
CPC .. G06F 16/178; G06F 11/1658; G06F 16/176; G06F 16/27; G06F 11/3419; G06F 11/3006; G06F 11/2097; G06F 11/2094
See application file for complete search history.

(56) References Cited

U.S. PATENT DOCUMENTS 5,179,700 A    1/1993  Aihara et al.
7,035,920 B2   4/2006  Harrison et al.
(Continued)

FOREIGN PATENT DOCUMENTS

CN    103838586    6/2014
WO    2002/017068  2/2002
WO    2011/073973  6/2011

OTHER PUBLICATIONS

Oracle Corporation: Programming interfaces Guide 2010 (retrieved on Sep. 24, 2012). Retrieved from the Internet<URS:http//docs.oracle.com/cd/E19683-01/816-5042/index.html>.

(Continued)

Primary Examiner — Abdullahi E Salad
(74) Attorney, Agent, or Firm — Patshegen IP LLC; Moshe Pinchas (57) ABSTRACT Systems and methods are provided for using a file-sharing service to identify, execute, and provide continuing access to remote computer programs. In certain embodiments, a list of files to be accessed remotely is provided to a first device, a selection is received from a user at the first device identifying a file from the provided list, and an application is executed on a second device to access a copy of the identified file, which is synchronized with a file-sharing service.

8 Claims, 7 Drawing Sheets (56) References Cited

U.S. PATENT DOCUMENTS

| | | | |
|---|---|---|---|
| 7,058,958 B1 | 6/2006 | Shutt et al. | |
| 7,213,228 B2 | 5/2007 | Putterman et al. | |
| 7,941,700 B2* | 5/2011 | Schlesinger | G06F 11/1482 714/15 |
| 7,950,026 B1 | 5/2011 | Urbach | |
| 8,171,118 B2 | 5/2012 | Sheehan et al. | |
| 8,392,556 B2* | 3/2013 | Goulet | G06Q 10/06 709/224 |
| 9,606,881 B1* | 3/2017 | Kekre | G06F 11/1662 |
| 2001/0047393 A1 | 11/2001 | Amer et al. | |
| 2001/0056554 A1* | 12/2001 | Chrabaszcz | G06F 11/1658 714/13 |
| 2002/0174010 A1 | 11/2002 | Rice | |
| 2003/0137522 A1 | 7/2003 | Kaasila et al. | |
| 2004/0133659 A1 | 7/2004 | Lacey et al. | |
| 2005/0005200 A1* | 1/2005 | Matena | G06F 9/5072 714/38.13 |
| 2005/0055322 A1* | 3/2005 | Masters | G06F 9/06 |
| 2005/0137908 A1* | 6/2005 | Fusari | G06F 9/45512 705/2 |
| 2006/0168282 A1* | 7/2006 | Turner | H04L 41/22 709/230 |
| 2007/0156856 A1 | 7/2007 | Shafron | |
| 2007/0207773 A1 | 9/2007 | Braunstein | |
| 2007/0220020 A1 | 9/2007 | Goto | |
| 2007/0288599 A1 | 12/2007 | Saul et al. | |
| 2008/0120538 A1 | 5/2008 | Kurz et al. | |
| 2008/0222618 A1 | 9/2008 | Valtchev | |
| 2008/0276195 A1 | 11/2008 | Moromisato et al. | |
| 2008/0288878 A1 | 11/2008 | Hayashi et al. | |
| 2009/0007139 A1 | 1/2009 | Jacobson et al. | |
| 2009/0070217 A1 | 3/2009 | Dhamaji et al. | |
| 2009/0177471 A1 | 7/2009 | Gong et al. | |
| 2009/0235177 A1 | 9/2009 | Saul et al. | |
| 2009/0300510 A1 | 12/2009 | Gantman et al. | |
| 2010/0153866 A1 | 6/2010 | Sharoni | |
| 2010/0269048 A1 | 10/2010 | Pahlavan et al. | |
| 2010/0281155 A1* | 11/2010 | Cipollone | G06F 11/3013 709/224 |
| 2012/0296959 A1 | 11/2012 | Momchilov et al. | |
| 2013/0212486 A1* | 8/2013 | Joshi | H04W 4/02 715/744 |
| 2013/0346962 A1 | 12/2013 | Fang et al. | |
| 2014/0208395 A1 | 7/2014 | Tietjen et al. | |

OTHER PUBLICATIONS

International Search Report of Application No. PCT/IL2012/050183 dated Oct. 2, 2012.

International Search Report of Application No. PCT/IL10/01040 dated Apr. 14, 2011.

\* cited by examiner

SYSTEMS AND METHODS FOR PROVIDING CONTINUING ACCESS TO A REMOTE COMPUTER PROGRAM

CROSS-REFERENCE TO RELATED APPLICATIONS

The present application is a continuation of commonly owned U.S. patent application Ser. No. 14/571,127, entitled: SYSTEMS AND METHODS FOR PROVIDING CONTINUING ACCESS TO A REMOTE COMPUTER PROGRAM, filed on Dec. 15, 2014, now U.S. Pat. No. 9,811,528, which claims priority to U.S. Provisional Application No. 61/916,471 filed on Dec. 16, 2013. The present application is also related to U.S. patent application Ser. No. 14/119,890 filed on May 23, 2012 and U.S. patent application Ser. No. 13/514,984 filed on Dec. 9, 2010. All of these applications are incorporated herein by reference in their entireties.

FIELD OF THE INVENTION

The present invention relates generally to providing remote access to applications and files. More particularly, the present invention relates to systems and methods for providing continuing access to remote computer programs and accessing files stored by file-sharing services using remote programs.

BACKGROUND OF THE INVENTION

In many known computer remote access tools, a user may connect to a remote device from another client computer/device such as a workstation using a remote access program or protocol. A user may receive at his workstation a display representative of the display of the remotely accessed computer. Using remote access programs, the user may then control the remote computer by performing actions such as, mouse clicks or taps (on touch-sensitive devices) or keyboard actions, which are transmitted to the remote device through a communication means such as a network.

A remote device may refer to desktop, personal computer, tablet, server, cellular phone or any device capable of executing software programs. Typically, a remote computer has a number of programs installed locally. For some users, it may be desirable to access one or more programs installed locally at a remote device from a computer/device which does not have the program locally stored. In other cases, it may be desirable to access one or more programs installed at a remote device, from a computer/device which has the program locally stored. In these cases, the user may wish to have the benefit of the settings/configuration of the program stored at the remote computer rather than the one stored locally at the client. In still other cases, the user may wish to use a different version of the program stored locally at the remote device, rather than the one stored locally at the client.

In certain known methods, to access a remotely located program, the user may have to remember in which remote device the desired program is installed. Furthermore, the user may need to remember or know additional information such as a username, password, and/or IP address of the remote computer in order to access and/or execute a remotely located program.

Additionally, problems may occur with respect to the remote device. For example, the remote computer may lose network connectivity, such that it can no longer be accessed by the user's client device. Alternatively, a remote device may not be capable of providing the user with adequate service. For example, the remote device may have network connectivity issues such as high latency and/or low bandwidth or the processing resources of the device itself may be insufficient. These processing resources may be statically limited due to hardware (e.g., having a slow processor or graphics card) or dynamically limited to the number of programs running on the remote device at any given time.

Thus, with respect to known methods, it becomes a task within itself to find a remote computer capable of providing adequate resources to the user. This process of trying different remote computers/devices may be very inefficient, causing delay, which in turn frustrates the user. Accordingly, it is beneficial to automatically select a remote device or provide the user with a choice of a remote device based upon resource usage statistics gathered from remotely accessible computers.

In known methods, if a user remotely connects to a remote device and runs a program, this device may lose connectivity to the user's device for any number of reasons (e.g., system crash or network problems), causing the user to be disconnected from the remote device and the program. The user may then need to try connecting to another remote device and program manually. This lost connection may also cause the user to lose a portion of their work. Accordingly, when a remote device loses connectivity to the user's device, it is beneficial to automatically connect the user to a new remote device and program. It is also beneficial to save, for the benefit of the user, work performed at the original remote device and provide it to the new remote device and program. In certain embodiments, this saving may be performed using a file-sharing service.

Certain well-known cloud file-sharing services such as DropBox, Box, Google Docs/Drive, Microsoft SkyDrive, etc., allow the user to store and share data/files. These services may also provide the user the ability to view or make limited modifications to certain file-types/formats supported by the file-sharing service. However, the interfaces provided by these services often provide limited functionality, not the robust and familiar feature set of locally stored applications. Accordingly, for supported file-types/formats it is beneficial to provide users with remote access to full-featured programs for viewing or modifying the files stored on cloud file-sharing services. Furthermore, for unsupported file-types/formats, it is beneficial to provide users with remote access to programs capable of viewing or modifying the files stored on cloud file-sharing services.

SUMMARY OF PARTICULAR EMBODIMENTS OF THE INVENTION

Embodiments of the present invention may provide a system and method for providing continuing access to a remote computer program. Certain embodiments of the present invention may associate a remotely stored file with a corresponding computer program and/or remote device. In certain embodiments, the remotely stored file may be synchronized using a file-sharing service. In certain embodiments, the system may include one or more program tools to run a computer program on a remote device, detect the failure of the remote device, connect to an alternative associated remote device in response to the detection of the failure, and execute a program on the alternative device. Certain embodiments of the present invention may include a program identification tool for associating identified remote computer programs, identified remote devices, and/ or identified alternative remote devices with remotely stored files by analyzing and detecting all or a subset of the information about the identified remote computer program (e.g., name, version, associated files types) and/or the identified remote device (e.g., name, IP address, available resources). Certain embodiments of the present invention may include a client application to receive information about said associations from said identification tool, to display a remotely executing computer program, and to control the remotely executing computer program. Remote computer programs may be installed locally on one or more devices. In certain embodiments, a client application may receive information about remotely stored files. In certain embodiments, the remotely stored files may also be stored locally and synchronized using a cloud file-sharing service. In certain embodiments of the present invention, a client application may be used to select a remote computer program using a selected file and execute the remote computer program on a different device.

Embodiments of the present invention may provide systems and methods for using a file-sharing service to identify, execute, and provide continuing access to a remote computer program. To do this, for example, one or more remote server and/or devices may be configured to receive a list of applications that are candidates for remote execution and/or to associate file-type identifiers with the candidate applications in the received list. The remote server and/or device may be configured to store device identifiers associated with a device and/or application identifiers associated with candidate applications. The remote server and/or device may be configured to provide, to another device, a list of files to be accessed remotely. The remote server and/or device may be configured to receive a selection from a user at a device, which identifies at least one file to be accessed from the provided list. The remote server and/or device may be configured to determine a target file-type identifier associated with the identified file based on the received selection. The remote server and/or device may be configured to select a stored device identifier and/or a stored application identifier based on a target file type identifier. Identifiers or other data may be stored in non-volatile media (e.g., a hard drive) or in volatile media (e.g., RAM). The remote server and/or device may be configured to cause a candidate application associated with an application identifier to execute locally on a selected device associated with a device identifier. The selected device may be different from the device that was provided with the list of files to be accessed remotely. The remote server and/or device may be configured to cause the candidate application to access a copy of an identified file, which may be synchronized with a file-sharing service.

BRIEF DESCRIPTION OF THE DRAWINGS

Further features of the invention, its nature and various advantages will be more apparent from the following detailed description of the embodiments, taken in conjunction with the accompanying drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE PRESENT INVENTION

In the following detailed description, numerous specific examples are set forth in order to provide a thorough understanding of the invention. However, it will be understood by those of ordinary skill in the art that the present invention may be practiced without these specific examples. In other instances, well-known methods, procedures, components, and circuits have not been described in detail so as not to obscure the present invention. For example, a database may be used, however, its structure and relationships are not described in detail as it is understood by those of ordinary skill in the art that a database may be used in any number of ways to store and retrieve information to implement various embodiments of the present invention.

Systems and methods according to embodiments of the present invention may provide a connection between a user's device and a remote device to enable a user to execute and remotely access/control a program stored locally on one or more devices that are remote from the user's device.

Further, systems and methods according to embodiments of the present invention may enable continuing access to a remote program. According to certain embodiments, if/when the user's device loses connectivity to the remote device and/or remote application, systems and methods described herein may be able to allow the user to continue working with minimal or no interruption. More specifically, embodiments of the present invention may provide a continuously running computer program tool to enable remote access to/control of a remote computer program and to switch such access and control among a group of remote devices to continue running the remote computer program. In certain embodiments, switching to an alternative device when connectivity to the original selected remote device is lost may involve terminating the application executing remotely on the original selected device, when that remote device regains connectivity.

To provide such switching, certain embodiments of the present invention may analyze the performance of a known collection of remote devices based upon a number of factors. Using data about the remote devices corresponding to these factors, the best performing device may be identified.

Depending on the application, the best performing device may be the remote device with the most available processing resources (e.g., fastest CPU, most memory, fastest graphics card, or most disk space). In other instances, the best performing device may be the one with the lowest network latency or the highest network bandwidth. For example, for computation intensive (e.g., CPU bound) programs processing capability may the most important factor. However, for interactive (e.g., drawing, media) applications, network latency may be the most important factor. In certain embodiments, the user will be asked to provide information about the program in order to establish the relative importance of the factors.

In certain embodiments, the relative importance of the factors pertaining to well-known programs is stored and no user inquiry is made as those programs. In certain embodiments, the analysis may be performed prior to connecting the user's device to a remote device for the first time, continuously, or periodically. Based upon the outcome of an initial, periodic, or continuous analysis, the user's device may automatically connect to or switch to a different remote device locally storing the remote application. In other instances, the user may be asked to switch to an alternative remote device. The data for evaluating the performance of a remote device may be provided by a system tool (e.g., Windows Task Manager) and/or provided by a program or process executing on the remote device. In certain embodiments, switching to an alternative device may involve terminating the application executing remotely on the original selected device.

According to certain embodiments, a remote application may be identified/selected for accessing data associated with a remotely or locally stored file. The remote application may be identified/selected for the purpose of opening, accessing, editing, viewing, etc. on a user's device the contents or data of any stored file regardless of where the computer program has been installed. For example, access to a remote computer program according to embodiments of the present invention may be performed by matching a file type of a file and a corresponding computer program installed on a remote computer. For instance, a user may open a word-processing document on a remote computer by selecting a word-processing file in, for example, a client program 300 shown in FIG. 1. In turn, a remote device may execute a "Microsoft Word" program, access the selected word-processing file or a copy of the selected word-processing file, and transmit a display of the "Microsoft Word" program executing at the remote computer to the client program. Embodiments of the present invention provide systems and methods for first selecting a remote device and then further selecting a remote computer program installed on the remote device. Additionally, embodiments of the present invention provide systems and methods for first selecting a remote computer program and then further selecting a remote device having the remote computer program installed thereon.

In certain embodiments, available remote programs/devices may be limited to those associated with a particular user. In certain embodiments, available remote programs/devices may include those of a user's group, or on an even wider scale—a group of remote programs/devices made available for use (devices unknown to a user). For example, a user may have three PCs (each a candidate remote device) each with a copy of Microsoft Word (each a candidate remote program) locally installed. According to certain embodiments, only the user's three PCs could be candidates for selection to execute Microsoft Word or other candidate programs remotely. In certain embodiments a user may be allowed to execute candidate remote programs on their devices (e.g., the three PCs) and those candidate devices associated with a close group (e.g., the devices of family members). In certain embodiments, certain users or service providers may make their remote devices/programs available for use by the public generally or to specific subscribers. Generally speaking, this type of device/program sharing allows devices/programs to be used to their fullest potential instead of lying dormant (e.g., when a local user is not engaged with a particular device/program). Users making remote devices/programs available to others may be compensated (e.g., based on usage, the number of devices/programs available, and/or the duration of availability). In certain embodiments, when a program is executed and accessed remotely a notification is provided to an administrator associated with the remote device. For example, a message box may be displayed at the remote device or an email or other suitable message may be sent. In certain embodiments, access restrictions (e.g., number of running instances) for the remote device/program are determined and enforced.

In certain embodiments, a remote computer program may not be initially stored locally on a remote computer. In these instances, the remote computer program may be cloned and/or installed on-demand at the remote computer before, during and/or after the connection of user to the remote device. In certain embodiments, the remote computer may itself be a virtual server or virtual instance that may be cloned and/or installed on a physical or virtual machine. For example, a virtual instance may be installed and/or used at the user's device itself or a previously unknown remote device when other known remote computers would not provide adequate performance according to the factors discussed herein. For instance, a user may be in a location where no previously known remote computers are accessible, have high network latency, or otherwise have insufficient computing resources (CPU speed, memory).

When executing programs on a remote device for remote use it may be beneficial to isolate them from other programs executing on the device. This program isolation allows the remotely accessed program to be independent of other programs on the remote device, such that if the remotely accessed program should fail or crash, other programs will be unaffected. Program isolation also provides benefits when programs are accessed remotely by previously unknown users or other users (e.g., family members), as discussed above. For example, program isolation may prevent the remotely accessing user from viewing, modifying, or otherwise accessing files or data outside the isolated region/session. Data/files within the isolated region/session may include all data/files needed to provide the user with remote access to the remote program. Data outside the isolated region/session may include the typical data/files associated with the device (e.g., other applications, picture files, personal documents). Program isolation may be provided by virtual machines, virtual applications, chroot techniques, FreeBSD jails, or any other suitable technique.

Figure 1:
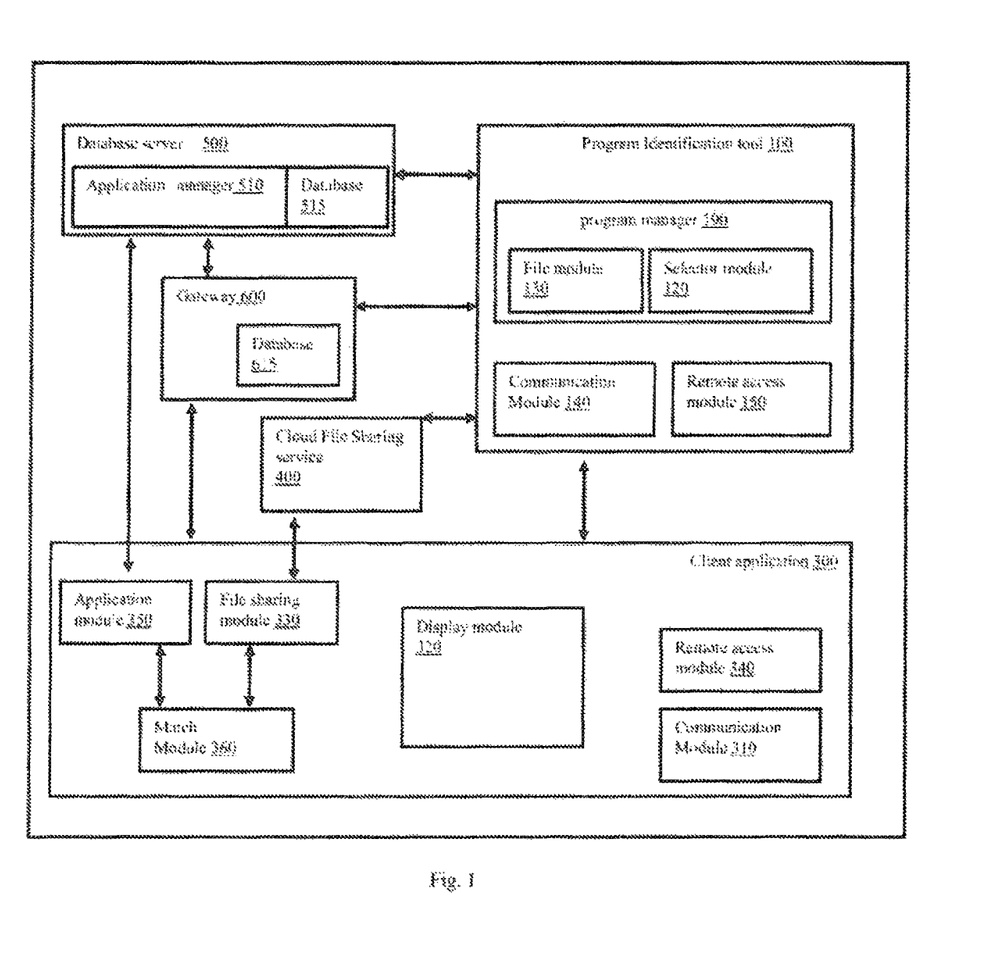
FIG. 1 is a schematic block illustration of a system for executing a remote computer program, accessing files using the remote computer program, and providing continuing access to a remote program according to some embodiments of the present invention.

Reference is now made to FIG. 1, which is a schematic block illustration of a computer system 10 for identifying, executing, and providing continuing access to a remote computer program according to some embodiments of the present invention. Computer system 10 may include a program identification tool 100, a client application 300, a database server 500, a cloud file-sharing service 400, and a gateway server 600.

In some embodiments of the present invention, database server 500 may include a database 515, which may be used for storing identifier data for making connections between a user device and a remote device. Identifier data may include relations and/or connections between servers and/or remote devices and/or workstations, remote computer IP addresses, MAC ids, associations between remote computer programs and file-types/formats, remote computer names, programs installed or existing on each remote computer, remote computer locations, and/or program icon information. Additionally, database 515 may include additional data for analyzing the status and/or performance of remote computers. For example, such data may include information pertaining to whether a remote computer is online or offline. Other data relating to hardware performance factors may also be stored, such as: network card type (e.g., 10/100/1000 M), CPU properties (e.g., clock-speed and/or architecture type), or the total amount of RAM. Other data in database 515 may include data related to the current state of the remote device, such as: network bandwidth, network latency, CPU loading, available RAM. Identifier data or other data may be stored in non-volatile media (e.g., a hard drive) or in volatile media (e.g., RAM).

In some embodiments of the present invention, database server 500 may include application manager 510, which may analyze and/or manage associations between remote computers, programs installed on each remote computer, and file-types/formats associated with and/or supported by each installed program. Application manager 510 may select a corresponding remote computer to be connected to client application 300 or a client device, and run a selected program on the remote device. The remote computer may be selected using certain performance factors, for example, the location of the remote computer, the distance from client application 300 or client device to the remote computer, network speed, remote computer hardware, and/or remote computer loading.

In some embodiments, application manager 510 may transmit database 515 to client application 300, to the client device in general, or to applications module 350 in particular. In certain embodiments, application manager 510 may filter the data to be transmitted. For example, client device may receive a single application information package that represents similar applications that are installed on one or more remote computers and/or that may be installed on-demand. Using information transmitted to the client device, client application 300 may display an application icon indicating that the program is available. This application icon or image may also be used in the display of files having file-types/formats associated with the program. In this case, the user may be unaware that the application is actually located on a remote device or on which device the program is installed. The user may then request to run this program (e.g., by clicking on an associated file) and the system may then automatically find, select and/or connect to a selected corresponding remote device and then run the program on the selected remote device, and/or access the associated file.

In certain embodiments, gateway server 600 may include a database 615, which may be used for storing identifier data for making connections between a user device and a remote computer. The identifiers and data stored in database 615 may be similar to the identifiers and data stored by database 515, discussed herein. Gateway server 600 may allocate suitable communication channels and serve as bridge and/or intermediary between a client device and a remote device. Additionally, gateway server 600 may establish connections between servers and/or workstations and/or databases. For example, gateway server may access a database that includes information about applications and users, such as application location information (e.g., on which remote devices an application is stored), access limitations (e.g., the number of allowed users of an application or data specifying the names or ids of users allowed to access an application), logging data and/or any other suitable data.

In some embodiments, program identification tool 100 may identify a device. For example, the device may be identified by receiving, analyzing, and/or storing one or more of the following: a device ID, an operating system id, a network MAC id, device name, GUID/UUID, and/or any other information that may be collected to enable unique identification of the device. After uniquely identifying a device, program identification tool 100 may register the device in a database stored either locally or remotely. The device may be registered by storing one or more identifiers in a database. The database may be stored on database server 500 or gateway 600.

Additionally, in some embodiments, program identification tool 100 may manually or automatically periodically update the database. For example, the database may be updated with information regarding the connection status (e.g., online/offline) of remote computers. The database may also be updated with other information that may be needed to establish communication between client application 300 and/or a client device and a remote computer. In some embodiments of the present invention, gateway 600, database server 500, and/or client program 300 may initiate a request for data updates and/or status updates from program identification tool 100, without waiting for updates initiated automatically by program identification tool 100.

In some embodiments of the present invention, system 10 may include a connection to a cloud file-sharing service 400, which may be or include any third party cloud file-sharing service such as Dropbox, Google Docs/Drive, Box and/or Skydrive, which may provide files and content synchronization between devices. Cloud file-sharing services differ from traditional remote file-sharing utilities (such as those exemplified by a UNIX style NFS "mount"). Importantly, cloud file-sharing services allow a user to access a local copy (which are available offline as well as online) of files stored remotely by the cloud file-sharing service, while also providing synchronization services between the remotely stored copy and the user's local copy.

In certain embodiments, accessing a file from a file-sharing service may involve determining whether a file-sharing service client is installed on a device, such as a remote device. In certain embodiments, the file-sharing service client is started if it is determined that the file-sharing service client is installed. In certain embodiments, if it is determined that the file-sharing service client is not installed, the file-sharing service client is installed. In certain embodiments, if it is determined that the file-sharing service client is not installed or is stopped, a file may be copied from the file-sharing service, another device (e.g., the user's device), or a system/server to a device and periodically synchronized (e.g., upon identifying a change to the copied file) from the device to the file-sharing service or to the other device/system/server, without installing the file-sharing service client (e.g., through a provided API).

Client application 300 may be used to display and synchronize a user's files on any device or workstation. In accordance with the present invention, such files may be accessed using a remote program installed on a remote computer. In some embodiments, program identification tool 100 may open files on a remote computer. For example, by identifying a remote application and remote device associated with a selected file, establishing a connection between the client device and the remote device, causing the remote device to execute the remote application, and causing the remote program to access the selected file or a copy of the selected file.

Additionally, when a remote computer is disconnected from a network (offline) or otherwise unavailable, in some embodiments, system 10 may select an alternative remote computer and/or a different remote application for accessing the selected file. Further, by using a cloud file-sharing service 400 for synchronizing changes to the file being accessed, by the remote application, the user is able to access the latest and most up-to-date version of the file. This enable the user to continue working on the same file (or same file data) on the alternative remote computer should the connection to a previously selected remote computer fail.

Program identification tool 100 may include program manager 190, communication module 140, and remote access module 150. Program manager 190 may include file module 130 and selector module 120. Program manager 190 may select a computer program and identify it using selector module 120. File module 130 may be used to analyze, detect, and identify all of the file-types/formats associated with a computer program. Any file data collected, analyzed, and produced by selector module 120 and/or file module 130 may be passed from computer program module 190 either directly or indirectly to a database through communication module 140. The database may be located at database server 500 and/or gateway 600.

Program manager 190 may identify running programs, analyze files opened or accessed by running programs, execute computer programs, open a file using a computer program (e.g., by simulating a double click on the file through an Operating System (OS) API, and/or save changes to a file opened by a computer program. Computer program module 190 may also synchronize files modified by a computer program with a cloud file-sharing service (e.g., cloud file-sharing service 400). By synchronizing the file with a file-sharing service, the latest version of the file becomes available to all remote computers with access to the file-sharing service, which enables continuing access to the file on other remote computers.

Communication module 140 may transfer data and/or manage communication between computer program identification tool 100 and/or its modules and gateway 600, database 500, cloud file-sharing service 400 and client application 300 and/or its modules, for example communication module 310.

Remote access module 150 may manage remote access protocols. Remote access module may create new remote sessions between a user's device and a remote device. Remote access module 150 may also perform user interface abstraction between the user's device and client device. For example, remote access module may receive mouse, touch, keyboard actions and/or other user interface events from the user device and transmit the display data or other state information from the remote device to the user's device, for example to client application 300.

File module 130 may analyze and/or detect all the file-types/formats associated with a computer program, for example, by using an operating system SDK/API or any other suitable technique. For example, computer program and file-type/format associations may be detected by reading certain registry keys for Windows operating systems. For instance, a file with a ".doc" extension may be opened using the Microsoft Word program. File module 130 may be used to directly open a file with a corresponding computer program, for example, by using the computer program interface. File module 130 may also be used to indirectly open a file by executing a shell program and identifying the file to open. For instance, file module 130 may indirectly open a file by simulating a double click on a file in a file explorer program.

Client program 300 may include a display module 320 to display the remote device display or other remote device state or outputs, a file-sharing module 330 to manage the communication with the cloud file service 400, an applications module 350 to manage the communication to/and from database server 500, and a match module 360 that may associate file-types/formats with applications (computer programs), a communication module 310, and/or remote access module 340.

Client application 300 may be executed on a separate (for example, remote) workstation than program identification tool 100. Program identification tool 100 may connect to client application 300 through a network using any existing remote access protocol. The remote access protocol may be used to display the status of the remote screen or remote application window in client program 300 (e.g., using display module 320). The remote access protocol may also be used to transmit actions based on mouse, touch events, keyboard action, and/or any other user interface action from client program 300. Remote access module 340 and remote access module 150 may include any existing remote access mechanism to establish the communication, transmission, and display of the screen and/or of user interface events.

In some embodiments, application names, icons and/or images, and files names, icons, and/or images may be displayed by client application 300 (e.g., using display module 320). A user may select an application or file by tapping or clicking on a displayed name, icon, and or image. In certain embodiments, a further indication may be displayed by client application 300 indicating that a file is accessible by a remote program. For example, an indicator may be placed next to or within a name or icon associated with a file (e.g., a "green light," indicating the file may be accessed, a "red light," indicating the file may not be accessed, a "yellow light," indicating limited access or performance issues). In certain embodiments, the associated name or icon itself indicates accessibility. For example, the name or icon may be displayed in shadow or "greyed out" to indicate that the file may not be accessed remotely. Accordingly, the client application 300 may find a remote computer associated with the selected application or file, establish communication with the remote computer, execute a computer program on the remote computer, and/or open the selected file with the associated computer program. The remote computer may then transmit the image display state of the remote application or the entre display state to the client application 300 for display to the user, for example by display module 320 on the user's device.

In some embodiments of the present invention, icons and/or images for a remote program or any file-type/format may be associated with a corresponding program icon and displayed to the user in client application 300, for example by display module 320. Icon and/or image data for a remote program may be read by file module 130 using operating system services, APIs, or registry information. Icon and/or image data may then be stored (e.g., in a database, such as database 515 and/or 615). This icon association may be performed by match module 360.

Client application 300 may be a web browser (e.g., Internet Explorer, Google Chrome, Safari, Firefox). Client application 300 may use webpages or window forms generated by other remote device (server, workstation, mobile device, tablets, and/or wearable devices). Client application 300 may also use webpages within an existing web application and/or website (such as Facebook, Google-+, LinkedIn or any other website). As described herein, client application 300 may be used to display applications and files, and to execute remote applications directly or indirectly by selecting a file using information received from program identification tool 100, database server 500, gateway 600, and/or cloud file-sharing service 400.

Client application 300 may be implemented as a web-based application, window, and/or mobile device oriented application (native mobile app). In some embodiments of the present invention, connection from the user's device to a remote computer may be accomplished, for example, by using standard internet protocols. For instance, the user's device may connect to the program identification tool 100 using the HTTP protocol.

In some embodiments, the same program may be installed on more than one remote computer and may be displayed as only a single icon, image, and/or text string in client application 300. Similarly, in some embodiments, more than one program may be installed for handling a given file-type/format on one or more remote computers and may also be displayed as only a single icon, image, and/or text string in client application 300. In other embodiments, selecting a program or file will reveal a list of remote devices and/or applications associated with the selected remote program or file. In this case, the file itself may be seen as a folder or directory leading to a further listing of remote machines and/or applications. Remote machines and/or applications may be organized separately or together. Further selecting a remote machine or application may cause a remote machine to execute an application and/or open the selected file or a copy of the selected file. In some embodiments of the present invention, client application 300 may associate files and the programs, for example, using match module 360 which may match file-types/formats for a file with one or more corresponding remote program(s) that support accessing (e.g., viewing and/or modifying) the particular file-type/format.

Additionally or alternatively, a supported program may be presented even without first being installed on any remote computer. In this case, the application may be installed on-demand on a remote computer, when the program or an associated file-type/format is selected by the user. The remote computer for program installation may be selected as discussed herein.

In some embodiments, all or some of the connections between program identification tool 100, client application 300, gateway 600, cloud file-sharing service 400, and database server 500 may be managed directly, by communication module 140, and/or communication module 310.

In some embodiments of the present invention, application module 350 and file-sharing module 330 may manage the connection between client application 300 and database server 500, gateway 600, and/or cloud file-sharing service 400. In addition, in some embodiments of the present invention, application module 350 and/or file-sharing module 330 may be or include virtual machine components or modules, and/or additionally be integrated and/or implemented in other modules or parts of other modules in the system 10.

In some embodiments, file-sharing module 330, application module 350, and/or match module 360 may be implemented on database server 500 and/or in other servers or parts of system 10, for example in gateway 600, and/or as part of another module and/or be merged in one or more modules and or within another module such as display module 320 and/or program manager 190.

In certain embodiments, client application 300 may execute additional operations, such as: traversing firewalls, enforcing security policies, activating a workflow, and/or other operations as described herein.

In some embodiments of the present invention, client application 300 may receive and display images generated by a remote computer device/program. In certain instances, client application 300 may display the entire desktop of the remote computer. In other instances, client application 300 may display only an image associated with the remote computer program itself (e.g., a window). All mouse, touch events, keyboard, and/or other user interface actions may be routed between the user's device and remote devices. The display and the remote user interface may be implemented by any existing remote access protocol and/or third-party modules, such as: LogMeIn, TeamViewer, VNC, Microsoft RDP, and/or GoToMyPC.

In some embodiments, client application 300 may provide parameters (e.g., display resolution) and/or other data (e.g., connection information) to enable the remote access solution to connect and operate. In certain instances, client application 300 will provide information to the remote access solution for selecting whether to display the entire desktop of the remote device or just a remote application specific screen (e.g., a window). Furthermore, during operation, user interface events such as mouse, keyboard, and/or touch inputs may be transmitted using communication module 140, communication module 310, and/or the remote access solution to the remote computer.

Communication module 140 within program identification tool 100 as well as communication module 310 within client application 300 may be a virtual module, i.e., implemented as part of a virtual machine. The communication format of communication module 140 as well as communication module 310 may be encrypted to provide additional security or adapted for any suitable communication technology.

In some embodiments, a QR code, HCCB, URL, or any other suitable type of code or link may be generated. The code/link may serve as an identifier and provide information suitable to make a connection with a remote device, to execute a remote program on the remote device, and/or open a file. The code/link may be generated by a module such as client application 300, gateway 600, database server 500, and/or program identification tool 100. The code may also be saved, for example, in database 515, database 615, and/or in another suitable storage location. Program identification tool 100 and/or client application 300 may transmit the code/link to a user or several users. The code/link may be transmitted or shared using any known technique. For example, the code/link may be transmitted via e-mail, SMS, and/or via a web-page. The code/link may be processed in response to a triggering event (e.g., by scanning, capturing it from a display using a device coupled to a camera, and/or clicking on the code/link). In certain embodiments, the device is executing client application 300. The code/link may be processed by client application 300, database server 500, and/or gateway 600. If the code/link is processed by client application 300, a connection may be made between a remote device identified by the code/link, a remote program identified by the code may also be executed on the remote device, and/or a file may be accessed by the remote program, with client application 300 providing a user interface to the remote program as discussed herein. Processing of the code/link may require exchange of additional data and/or instructions. For example additional data may be exchanged with gateway 600, client application 300, and/or database server 500. Examples of additional data to be exchanged include: IP addresses, access/security limitations, expiry information for the code/link, and/or any other required data. The code/link may also contain or be associated with additional information (e.g., information stored in a database). For example, the code/link may contain or be associated with access control information. Access control information may include a username/password, files-access permissions, address information (e.g., IP, MAC, or other addresses), and/or expiry information. The authenticity of the code/link may be verified using this additional information or other data contained in the code itself The code/link may be in any data format. For example, the code/link may be an image (e.g., a PNG, BMP, JPG, GIF, or another image format), a hyperlink, raw binary data, a list of files/applications, or instructions. The code/link may include information such as: a URL, application name, application directory path, or other additional parameters.

If the code/link is valid, by processing the information in the code/link, client application 300 may establish a connection with a remote computer, and/or remote program as discussed herein. In some embodiments, the code/link contains or is associated with expiry information. For example the code/link may be limited to: a certain number of connections to a computer device/program, accessing a specific file with an associated computer program/device, a certain expiration date, and/or period of usage. When code/link has limited use connections made using the code may be recorded and stored. The number of connections made using a code/link may be stored in a database (e.g., database 515 or 615) or in other suitable storage.

In some embodiments, the code/link may include a URL. By processing such a code/link, it may connect an application (e.g., client application 300) or the user's device to a remote computer program and access a file using the remote program. In other cases, processing of the code/link may cause the user's device to execute an internet browser, or execute a native app or application to enable the user to interface with a remote program and/or access a file using the remote program.

Figure 2:
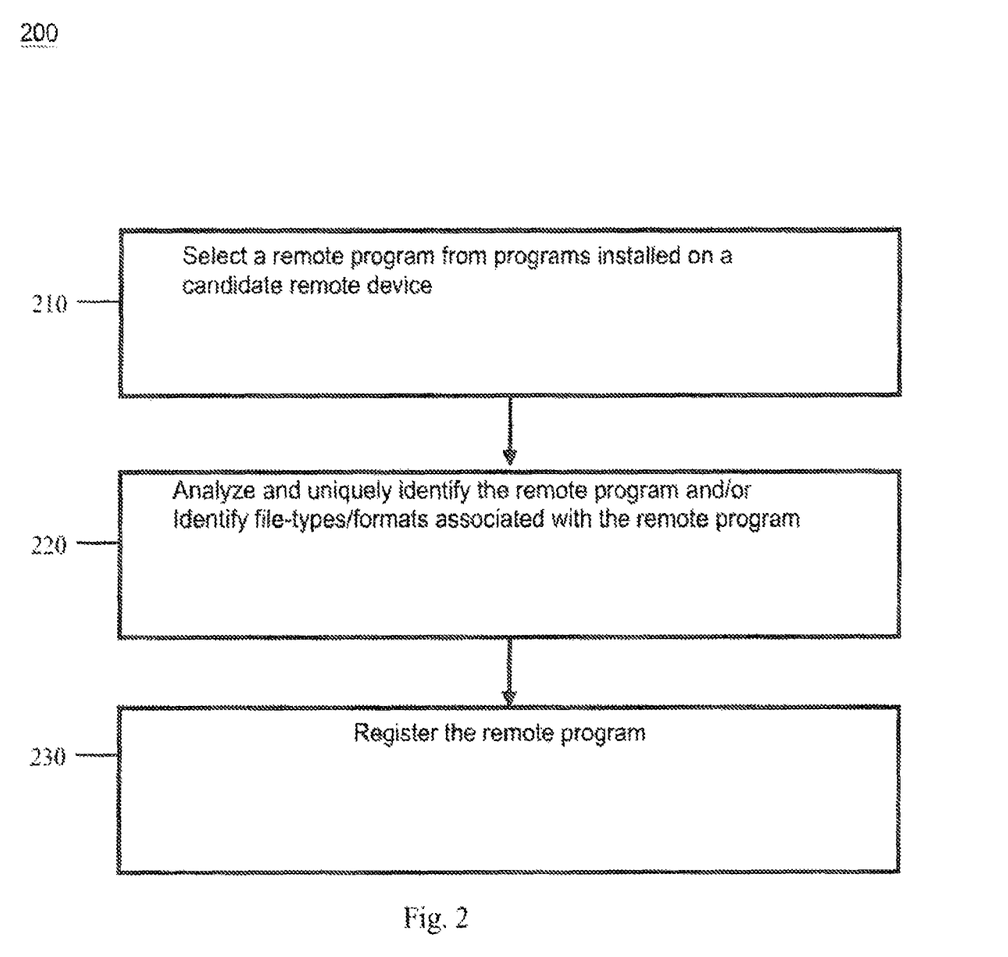
FIG. 2 is a flowchart illustrating a method for identifying a remote computer program according to embodiments of the present invention.

Reference is now made to FIG. 2, which is a flowchart illustrating a method 200 for identifying a remote program according to embodiments of the present invention. As indicated in block 210, the method may include selecting a remote program from programs installed or available on a candidate remote device. Remote programs installed on a device may be located using an appropriate operating system function call/API or registry search. The program may be selected manually by a user and/or automatically by detecting all programs installed or available on the device. As indicated in block 220, the method may include analyzing and uniquely identifying a remote program. Remote programs may be uniquely identified by name, icon and/or image, version, developer, manufacturer, assembly code, cryptographic signature, hashing the application executable/binaries, GUID/UUID, and/or using any other suitable technique to uniquely identify a computer program. Additionally, the method may include analyzing and/or identifying all file-types/formats associated with the remote program. Generally, an associated file-type/format is one that can be accessed (e.g., viewed and/or edited) by the remote program. As indicated in block 230, the method may include registering the remote program by transmitting information about the remote program. The information may be transmitted to database server 500 and/or gateway 600 to be saved or stored (e.g., in database 515 or 615).

Saving/storing this information allows association between remote devices, remote programs, and/or file-types/formats, as discussed herein. In some embodiments, the information may be saved locally at the device and/or be transmitted directly to client program 300 (e.g., using communication module 140 and/or communication module 310).

Figure 3:
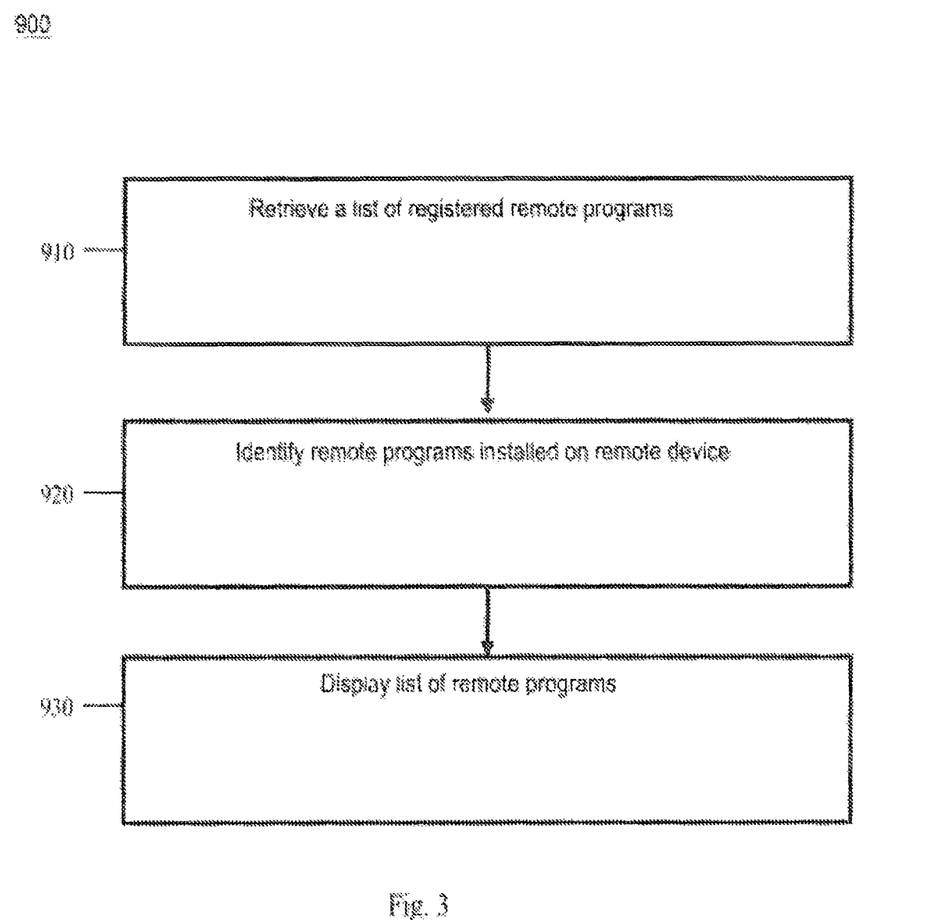
FIG. 3 is a flowchart illustrating a method for selecting a remote computer program according to embodiments of the present invention.

Reference is now made to FIG. 3, which is a flowchart illustrating a method 900 for selecting a remote program according to certain embodiments of the present invention. As indicated in block 910, the method may include retrieving a list of registered remote programs. The registered remote programs may have been identified, selected, and registered by different devices, as described in FIG. 2. As indicated in block 920, the method may include identifying remote programs that may be installed locally on one or more remote devices. In some embodiments of the present invention, as indicated in block 930, the method may include displaying a list of the remote programs to the user. For example, a list of remote programs may be displayed using client application 300 and/or display manager 320. In some embodiments, when more than one of the same remote program is installed and/or available on more than one remote device(s) the remote program may be displayed only once (e.g., using only a single name or icon). In some embodiments, the same remote program may be identified using a saved unique identifier as described in step 220 of FIG. 2. Identifier data or other data may be stored in non-volatile media (e.g., a hard drive) or in volatile media (e.g., RAM).

Figure 4:
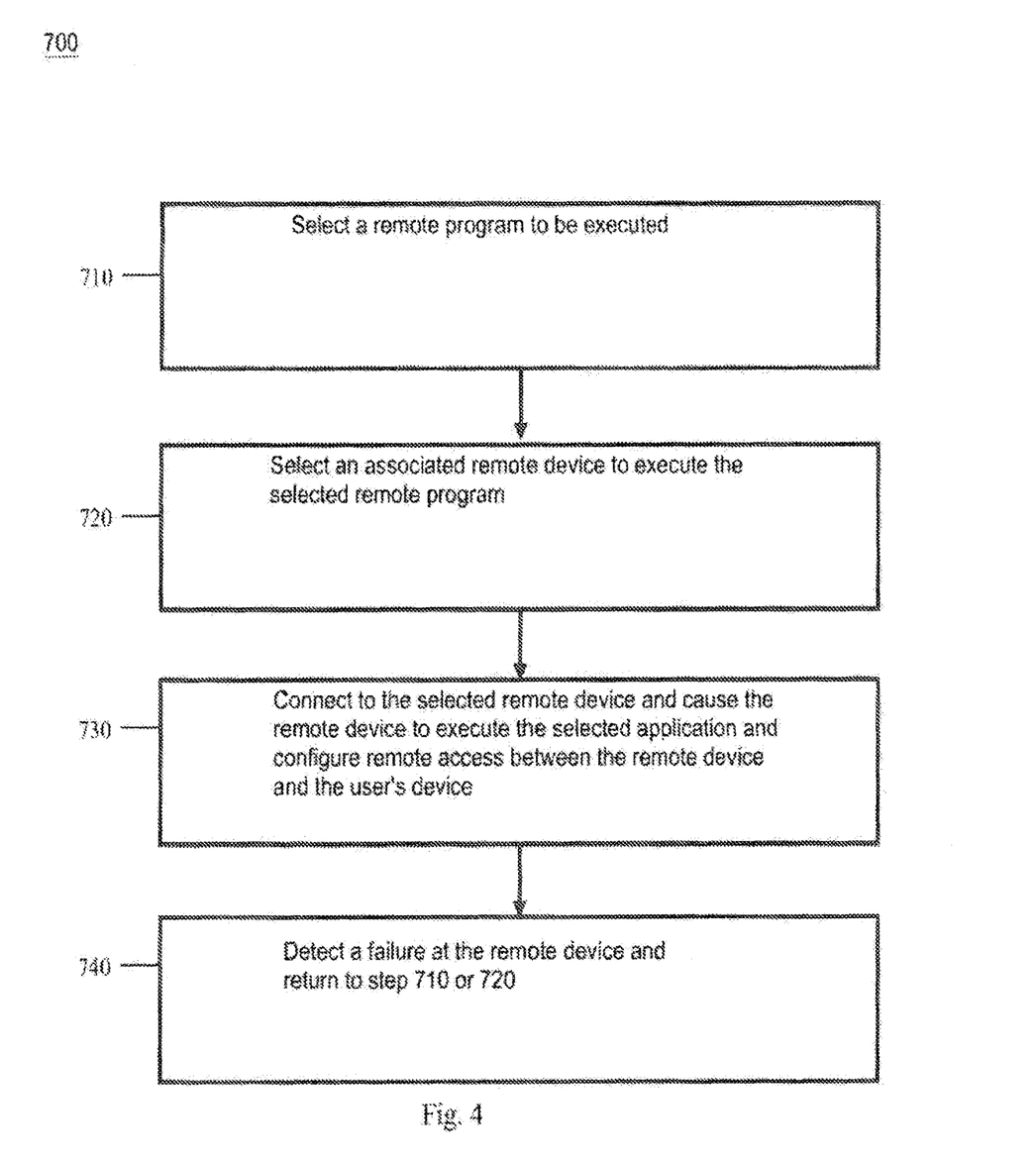
FIG. 4 is a flowchart illustrating a method for providing continuing access to a remote computer program according to embodiments of the present invention.

Reference is now made to FIG. 4, which is a flowchart illustrating a method 700 for providing continuing access to a remote program according to embodiments of the present invention. As indicated in block 710, the method may include selecting a remote program to be executed. The remote program may be selected by a user, for example using client application 300. Alternatively, the remote program may be selected automatically, for example, by a timer or agent. As indicated in block 720, the method may include selecting an associated remote device on which the selected remote program is installed or available. In some embodiments of the present invention, the method may additionally employ filters for selecting and/or displaying a list of remote devices. For example, remote devices that are offline and/or do not have the selected remote program may be ignored and not displayed. Additionally or alternatively, the method may include finding remote devices that will provide an acceptable user experience. For example, the remote device geographically closest to the user's device may be selected. Additionally or alternatively, the method may include finding the device having the best hardware (e.g., CPU, memory, graphics card), lowest network latency, highest network bandwidth, and/or most available resources. In some embodiments, when a remote program is registered, a registration timestamp may also be saved. The remote device may also be selected using the recorded time stamp. For example, if two devices are determined to have equivalent performance, the remote device may be selected using the earliest or latest timestamp. Additionally or alternatively, in some embodiments of the present invention, a user may assign, priorities to remote devices and/or remote programs. The remote program and/or remote device may then be selected using the assigned priority. The user may define the priorities of remote programs and remote devices, independently or dependently. Priorities of remote programs and remote devices may be combined to generate an overall priority.

As indicated in block 730, the method may include connecting to the remote device selected as in block 720, and causing the remote device to execute the selected remote program. As discussed herein, the remote access/user interface mechanisms between the remote device and the user's device may be done directly or through other remote access protocols and/or third-party solutions, such as: LogMein, TeamViewer, Microsoft RDP, VNC, and/or GoToMyPC. In some embodiments, the step indicated in block 730 may be performed in two or more sub-steps. The first sub-step may include connecting to and/or executing the remote program on the selected remote computer. The second sub-step may include establishing a remote user interface, as discussed herein to transmit user interface events at one device to a second device and transmit images generated by the second device to the first device.

As indicated in block 740, the method may include detecting a failure of the connection between the selected remote device and the user's device. Upon detecting such a failure, the user's device or another device may retry to re-establish communication between the original selected remote device and the user's device. Alternatively, an alternative remote device may be selected to run the selected remote program and/or alternative remote program. The alternative remote device and/or alternative remote program may be selected as described herein.

Figure 5:
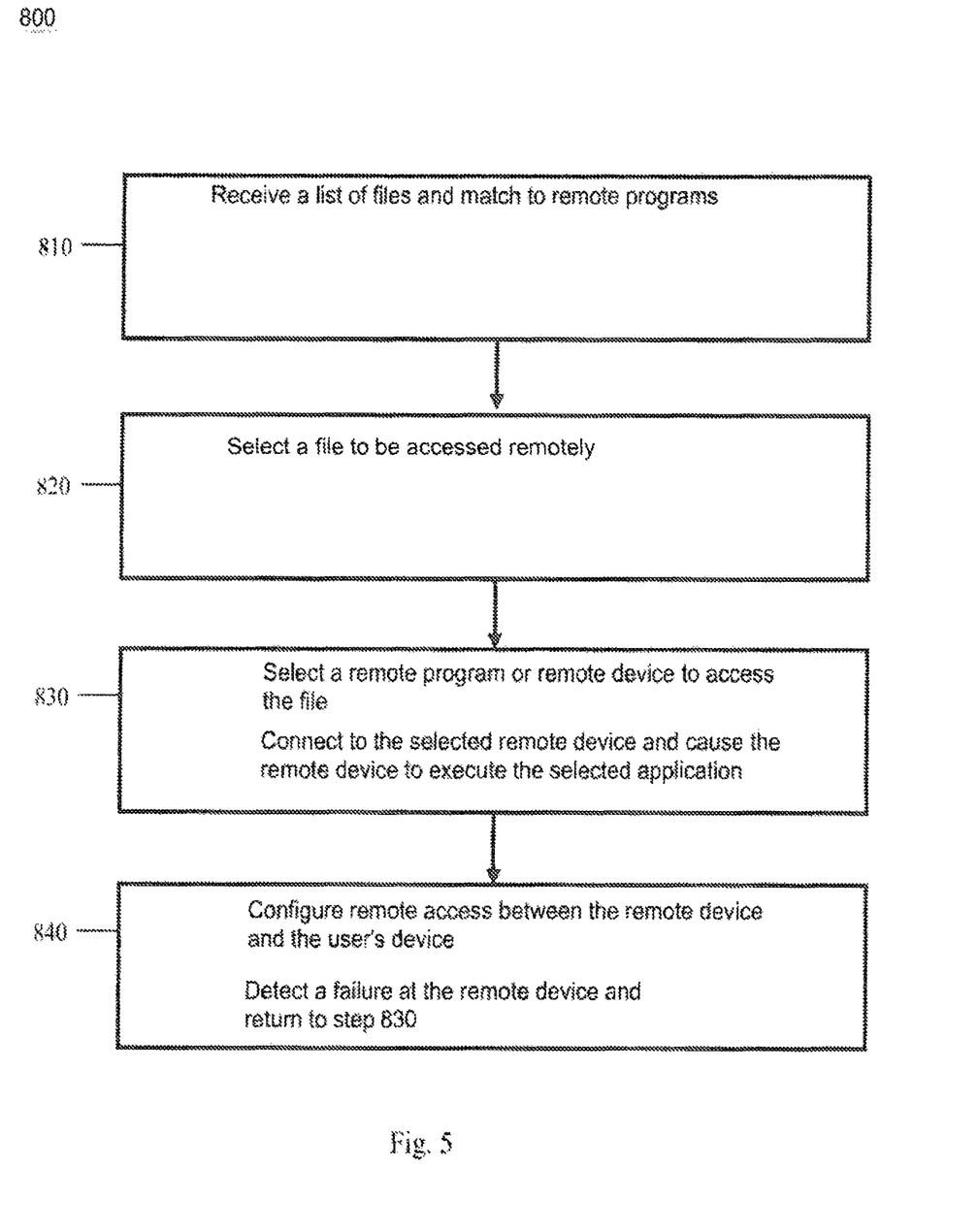
FIG. 5 is a flowchart illustrating a method for accessing a selected file with a remote computer program according to embodiments of the present invention.

Reference is now made to FIG. 5, which is a flowchart illustrating a method 800 for accessing a file using an associated remote program according to embodiments of the present invention. As indicated in block 810, the method may include matching files in a list of files to remote programs according to some embodiment of the present invention. For example, a list of files may be received from the user's device, database server 600, cloud file-sharing service 400, or another source. The files in the list of files may be matched to one or more associated remote programs. Matching may be performed by database server 600, gateway 500, program identification tool 190, client application 300, or another suitable computing device or module. A file may be matched to one or more remote programs by determining the file-type/format of the file and comparing it to the same file-types/formats previously determined to be accessible by a given remote program. Previous associations may have been determined and saved as described herein with respect to file module 130.

As indicated in block 820, the method may include selecting a file for access (e.g., view or modify). A file may be selected by clicking on the displayed file name and/or a display icon associated with the file. File names and/or icons may be displayed by client application 300 or display module 320. As indicated in block 830, the method may include automatically determining or having the user select an associated remote program, and/or automatically determining or having the user select an associated remote device. The remote program and/or remote device may be determined and/or selected as described herein. Block 830 may also include connecting to the selected remote device, causing the remote device to execute the selected remote program and/or causing the remote program to access the selected file. In certain embodiments, the file may include the state of a virtual machine or virtual application. In these instances opening the file restores the state of a virtual application/machine allowing the user to return precisely to the point in time the state was last captured or synchronized, for example by restoring device/program state/settings that are not captured in other file-types (e.g., Word documents).

In certain embodiments, causing the remote program to access the selected file may involve accessing the file from a file-sharing service, which may further require determining whether a file-sharing service client is installed on a device, such as a remote device. In certain embodiments, the file-sharing service client is started if it is determined that the file-sharing service client is installed. In certain embodiments, if it is determined that the file-sharing service client is not installed, the file-sharing service client is installed. In certain embodiments, if it is determined that the file-sharing service client is not installed or is stopped, a file may be copied from the file-sharing service, another device (e.g., the user's device), or a system/server to a device and periodically synchronized (e.g., upon identifying a change to the copied file) from the device to the file-sharing service or to the other device/system/server, without installing the file-sharing service client (e.g., through a provided API).

As indicated, block 840 includes setting up a remote user interface between the user's device and the remote device. As discussed herein, the remote access/user interface mechanisms between the remote device and the user's device may be done directly or through other remote access protocols and/or third-party solutions, such as: LogMein, TeamViewer, Microsoft RDP, VNC, and/or GoToMyPC. In some embodiments, the step indicated in block 840 may be performed in two or more sub-steps. The first sub-step may include connecting to and/or executing the remote program on the selected remote computer. The second sub-step may include establishing a remote user interface, as discussed herein.

As indicated in block 840, the method may also include detecting a failure of the connection between the selected remote device and the user's device. Upon detecting such a failure, the user's device or another device may retry to re-establish communication between the original selected remote device and the user's device. Alternatively, an alternative remote device may be selected to run the selected remote program perhaps using the same or an alternative remote program. The alternative remote device and/or alternative remote program may be selected as described herein.

Figure 6:
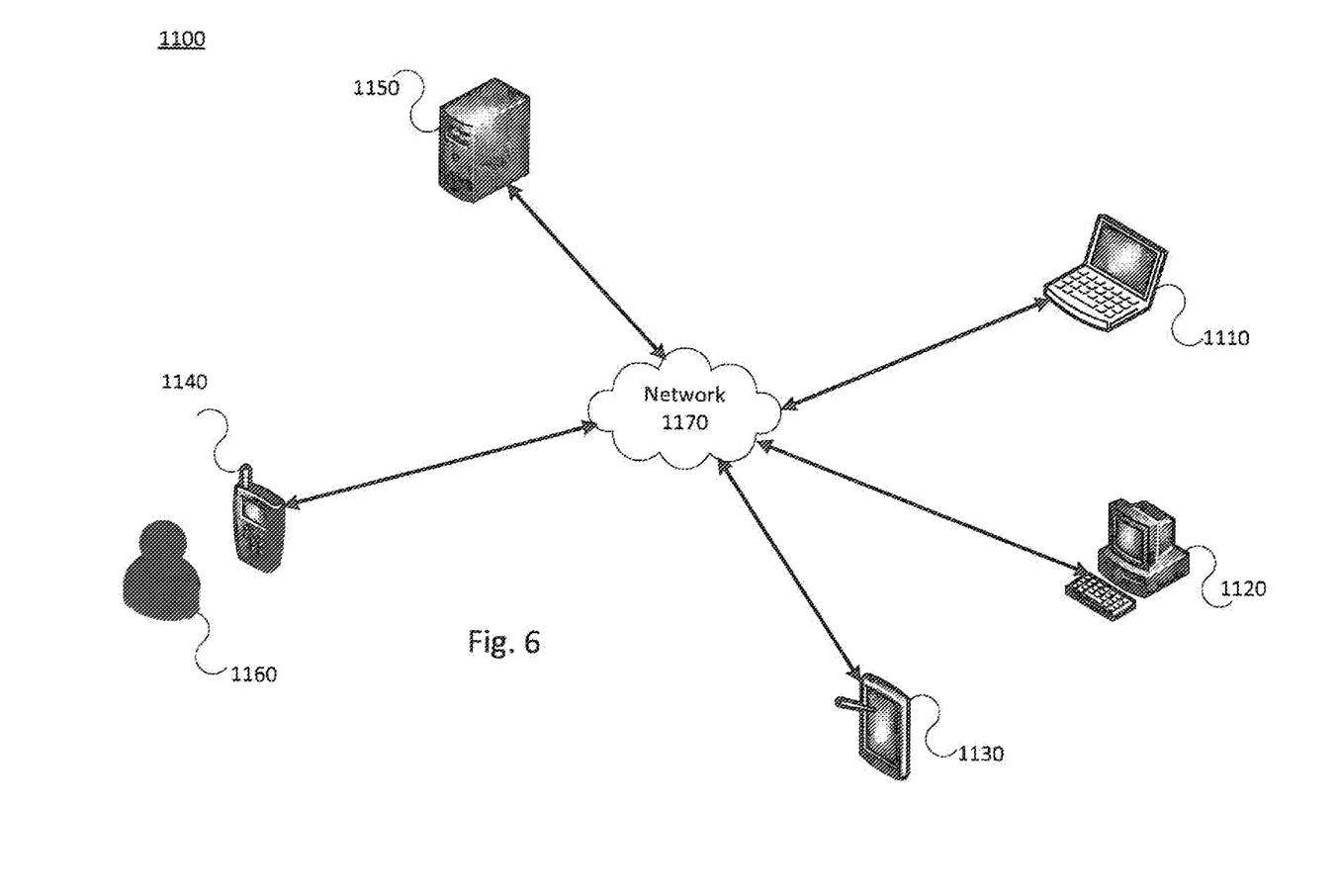
FIG. 6 is an illustration of a system for executing a remote computer program, accessing files using the remote computer program, and providing continuing access to a remote program according to some embodiments of the present invention.

Reference is now made to FIG. 6, which illustrates a system 1100 according to certain embodiments of the invention. System 1100 comprises at least two devices but may include a greater number of devices. Each device may be coupled to a network 1170. System 1100 may include a device 1110, 1120, 1130, 1150 configured to transmit a list of applications stored locally that are candidates for remote execution. System 1100 may include a device 1110, 1120, 1130, 1150 configured to receive the list of candidate applications. The list of applications may be received and transmitted in any suitable manner, such as those discussed herein. Device 1110, 1120, 1130, 1150 may also be configured to: associate a file-type identifier with candidate applications in a received list of candidate applications, store a device identifier associated with a device, and/or store an application identifier associated with a candidate applications. Identifiers may be associated and stored in any suitable manner, such as those described herein. Device 1110, 1120, 1130, 1150 may also be configured to provide a list of files to be accessed remotely. The list of files may be provided in any suitable manner (e.g., from a file-sharing service). System 1100 includes a device 1140, which may have a user 1160. Device 1140 may be configured to receive a list of files from another device and/or from a file-sharing service. Device 1140 may also be configured to transmit a selection identifying a file from a list of files (e.g., the received list of files). Receiving and transmitting may be done in any suitable manner, such as those described herein. Device 1110, 1120, 1130, 1150 may also be configured to receive a selection identifying a file and determine a target file-type identifier associated with the identified file. A target file-type identifier may be determined in any suitable manner, such as those discussed herein. Device 1110, 1120, 1130, 1150 may also be configured to select a stored device identifier and/or a stored application identifier based on a determined target file-type identifier. Identifiers may be selected in any suitable manner, such as those discussed herein. Device 1110, 1120, 1130, 1150 may also be configured to transmit an identified file and/or a selected application identifier based on a selected device identifier. A file or identifier may be transmitted in any suitable manner, such as those discussed herein. System 1100 also includes a device 1110, 1120, 1130, 1150 configured to receive a transmitted application identifier and/or an identified file. A file or identifier may be received in any manner, such as those discussed herein. Device 1110, 1120, 1130, 1150 may also be configured to execute an application locally based on a received application identifier or a received identified file. An application may be executed in any suitable manner, such as those discussed herein. Device 1110, 1120, 1130, 1150 may also be configured to cause an executed application to access a copy of an identified file, and/or synchronize a copy of an identified file with a file-sharing service. A copy of a file may be accessed and/or synchronized with a file-sharing service in any suitable manner, such as those discussed herein.

Figure 7:
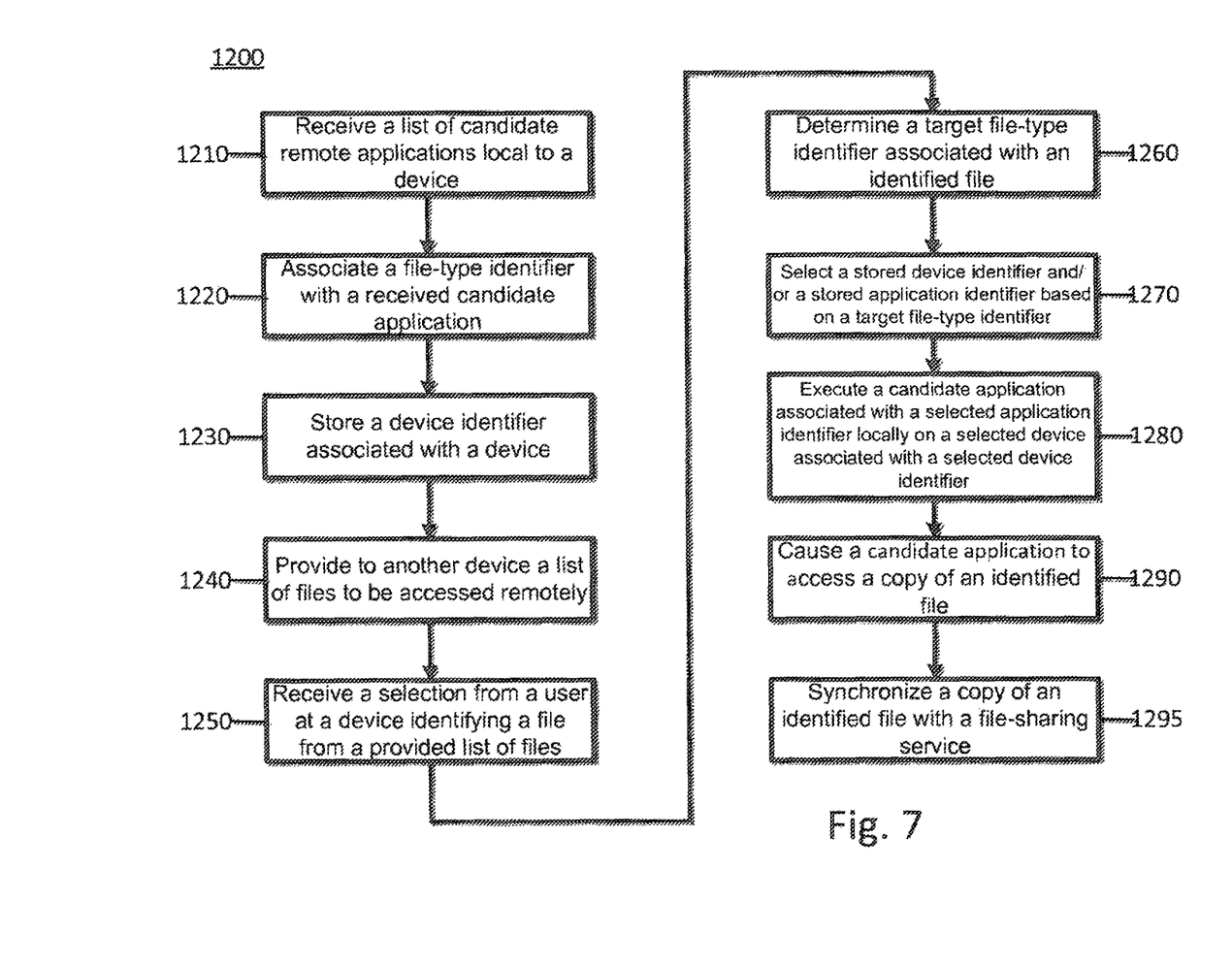
FIG. 7 is a flowchart illustrating a method for executing a remote computer program, accessing files using the remote computer program, and providing continuing access to a remote program according to some embodiments of the present invention.

Reference is now made to FIG. 7, which is a flowchart illustrating a method 1200 according to certain embodiments of the invention. As indicated in step 1210, the method may include receiving a list of candidate remote applications local to a device. As indicated in step 1220, the method may include associating a file-type identifier with a received candidate application. As indicated in step 1230, the method may include storing a device identifier associated with a device. As indicated in step 1240, the method may include providing to another device a list of files to be accessed remotely. As indicated in step 1250, the method may include receiving a selection from a user at a device identifying a file from a provided list of files. As indicated in step 1260, the method may include determining a target file-type identifier associated with an identified file. As indicated in step 1270, the method may include selecting a stored device identifier and/or selecting a stored application identifier based on a target file-type identifier. As indicated in step 1280, the method may include executing a candidate application associated with a selected application identifier locally on a selected device associated with a selected device identifier. As indicated in step 1290, the method may include causing a candidate application to access a copy of an identified file. As indicated in step 1295, the method may include synchronizing a copy of a file with a file-sharing service. The steps of method 1200 may be performed in any suitable manner, such as those discussed herein.

Program identification tool 100 and remote client application 300 may each be, for example, a computer program, which may be stored in a general purpose computer or in an apparatus which may be specially constructed for the purpose of using a file-sharing service to identify, execute, and provide continuing access to a remote computer program. As mentioned herein, client application 300 may be executed on a different (for example, remote) workstation than program identification tool 100. Program identification tool 100 and client application 300 may each be stored in a non-transitory computer readable storage medium, such as, but not limited to, any type of memory device, including floppy disks, optical disks, magnetic-optical disks, read-only memories (ROM's), compact disc read-only memories (CD-ROM's), random access memories (RAM's), electrically programmable read-only memories (EPROM's), electrically erasable and programmable read only memories (EEPROM's), FLASH memory, magnetic or optical cards, or any other type of media suitable for storing.

Program identification tool 100 and client application 300 may each be implemented in computers, wireless, handheld, and/or portable communication devices, such as, for example, wireless and cellular telephones, smart telephones, personal digital assistants (PDAs), tablet computers, wearable devices and any device that may provide wired and/or wireless access to a network such as, an intranet or the internet. In certain embodiments program identification tool 100 may be installed directly on a device running a commodity operating system (Windows, Linux, OSX, Android, IOS, etc.) as a user or system program/service. This direct installation technique allows a user to install computer program identification tool 100 in the same manner as any other program is installed, while also allowing the user to remotely access programs installed on the device on which program identification tool 100 is installed. In certain embodiments, direct installation of program identification tool 100 on a device allows remote access to applications locally installed on the device without virtualization (i.e., the application runs natively on the device, without machine or application virtualization). It is appreciated that the present invention may be used in a variety of applications.

It will be appreciated that the terms "computer", "workstation", "device" and "machine" may be used interchangeably and have substantially the same meaning in the present document. It will also be appreciated that the terms "program", "software" and "application" may be used interchangeably and have substantially the same meaning in the present document.

While there have been shown and described various novel features of the invention as applied to particular embodiments thereof, it will be understood that various omissions and substitutions and changes in the form and details of the systems, methods and media described and illustrated, may be made by those skilled in the art without departing from the spirit of the invention. Those skilled in the art will recognize, based on the above disclosure and an understanding therefrom of the teachings of the invention, that the particular hardware and devices that are part of the invention, and the general functionality provided by and incorporated therein, may vary in different embodiments of the invention. Accordingly, the particular system components, steps, and results shown in the accompanying figures are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation, and the present invention is limited only by the claims which follow.

What is claimed is:
1. A system comprising:
   a first device configured to:
     transmit a list of local applications that are candidates for remote execution;

a second device configured to:
  receive the list of candidate applications;
  associate at least one file-type identifier with at least one of the candidate applications in the received list;
  store at least one device identifier associated with the first device;
  store at least one application identifier associated with each one of the candidate applications;
  provide a list of files to be accessed either remotely or locally;
a third device configured to:
  receive a list of files from a file-sharing service;
  transmit a selection identifying at least one file from the received list;
wherein the second device is further configured to:
  receive the selection identifying the at least one file;
  determine a target file-type identifier associated with the identified at least one file based on the received selection;
  select at least one of the stored device identifiers and at least one of the stored application identifiers based on the target file-type identifier;
  transmit the identified at least one file or transmit the selected application identifier based on the selected device identifier; and
a fourth device, different or same from or the same as the third device, configured to:
  receive the transmitted application identifier or the identified at least one file;
  execute an application locally based on the received application identifier or the received identified at least one file; and
  cause the executed application to access a copy of the identified at least one file, wherein the copy of the identified at least one file is synchronized with a file-sharing service.

2. The system of claim 1, wherein the one or more of the first, second, third and fourth devices are the same device.

3. A system comprising:
a first device configured to:
  generate a code or link to share an application for remote execution;
  generate a code or link including expiry information;
a second device configured to:
  receive a generated code or link of an application;
  send the generated code or link to third device to be analyzed and executed;
a third device configured to:
  receive a generated code or link;
  analyze the code or link and determine if it has expired based on the expiry information;
  select at least one device identifier associated with the one of the devices have the shared application installed on;
  select at least one application identifier associated with the shared applications;
wherein the second device is further configured to:
  receive the selection identifying the at least one application;
  select at least one of the stored device identifiers and at least one of the stored application identifiers;
  transmit the identified at least the selected application identifier based on the selected device identifier; and
a fourth device, different from the third device, configured to:
  receive the transmitted application identifier;
  execute an application locally based on the received application identifier.

4. The system of claim 3, wherein one or more of the first, second, third and fourth devices are the same device.

5. The system of claim 3, wherein the expiry information includes:
  a. a certain number of connections to computer devices or programs;
  b. accessing a specific file with an associated computer program or device;
  c. a certain expiration date and/or period of usage.

6. A system comprising:
a first device configured to:
  generate a code or link to share a file to be open by a remote application;
  generate a code or link including expiry information;
a second device configured to:
  receive a generated code or link of a file;
  send the generated code or link to third device to be analyzed and executed;
a third device configured to:
  receive a generated code or link;
  analyze the code or link and determine if it has expired based on the expiry information;
  select at least one of the stored device identifiers and at least one of the stored application identifiers;
  transmit the identified at least the selected application identifier based on the selected device identifier; and
a fourth device, different from the third device, configured to:
  receive the transmitted application identifier or the identified at least one file;
  execute an application locally based on the received application identifier or the received identified at least one file; and
  cause the executed application to access a copy of the identified at least one file, wherein the copy of the identified at least one file is synchronized with a file-sharing service.

7. The system of claim 6, wherein one or more of the first, second, third and fourth devices are the same device.

8. The system of claim 6, wherein the expiry information includes:
  a. a certain number of connections to computer devices or programs;
  b. accessing a specific file with an associated computer program or device;
  c. a certain expiration date and/or period of usage.

* * * * *